No. 739,753. PATENTED SEPT. 22, 1903.
E. KEMPSHALL.
PLAYING BALL.
APPLICATION FILED JUNE 14, 1902.
NO MODEL.
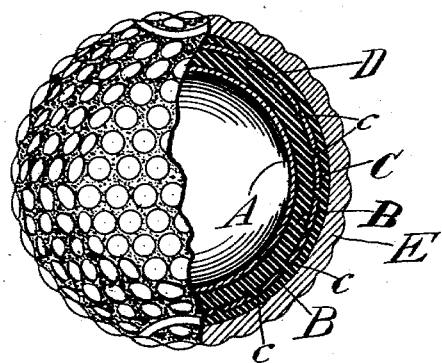
Witnesses:
C. H. Kelsey.
Fred. E. Maynard.
Inventor:
Eleazer Kempshall,
By his Attorney,
F. H. Richards.

No. 739,753.   Patented September 22, 1903.

UNITED STATES PATENT OFFICE.

ELEAZER KEMPSHALL, OF BOSTON, MASSACHUSETTS.

PLAYING-BALL.

SPECIFICATION forming part of Letters Patent No. 739,753, dated September 22, 1903.

Application filed June 14, 1902. Serial No. 111,766. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to playing-balls, such as used in golf and other games; and its object is to improve its construction, quality, and efficiency.

The accompanying drawing illustrates a completed ball, partly broken away to disclose its construction.

Upon a hollow metal shell A, I apply a layer of soft rubber B and incase the same within a metal shell C, which is provided throughout with perforations c. Upon this metal shell or layer is applied an additional layer D of soft rubber or plastic material. I inclose the core or ball thus formed in a gutta-percha shell E, which is preferably compressed upon the filling by means of forming and heating dies. It will be seen that the hard shell C is embedded in the rubber, the layers B and D being integral, portions of the rubber lying within the perforations in the shell C. The weight of the ball is near its periphery, thereby giving it a maximum rotating power, which is a desideratum. By making the shells A and C of springy material a ball is produced having phenomenal flying power. The rubber layer D prevents peening of the gutta-percha cover.

Variations may be resorted to within the scope of my invention.

Having described my invention, I claim—

1. A playing-ball comprising a springy hollow core, a hard shell of plastic material, an intervening layer of soft rubber and a metal layer embedded in said soft-rubber layer.

2. A playing-ball comprising a hard hollow core, a perforated metal shell surrounding said core and incased by rubber, and a shell of gutta-percha holding said rubber and core under compression.

3. A playing-ball comprising a hollow metal core, a soft-rubber layer, a perforated metal shell embedded in the rubber, and a shell of gutta-percha.

4. A playing-ball comprising a hollow hard springy core, two soft-rubber layers thereon, a shell of metal between said layers, and a shell of gutta-percha.

5. A playing-ball comprising a hollow hard springy core, a shell thereon composed of layers of soft rubber and a layer of perforated metal, said soft-rubber layers being integral, and a cover of gutta-percha compressed upon the ball.

6. A playing-ball comprising a plurality of distinct metal shells, a separating-layer of soft rubber, a cover of gutta-percha; and a rubber layer between said cover and the outer metal shell.

7. A playing-ball comprising a thin metallic shell, a layer of soft rubber thereon, a thin, hard, perforated shell upon said soft rubber, a second layer of soft rubber upon said perforated shell and a shell of gutta-percha holding said second layer under compression.

8. A playing-ball comprising a metal core, an inclosing shell of gutta-percha; an intervening layer of soft springy material, and a shell of metal embedded in said intervening layer.

9. A playing-ball comprising a hollow metal core; an inclosing shell of gutta-percha; an intervening layer of rubber; and a shell of metal embedded in said intervening layer.

10. A playing-ball comprising a plurality of distinct metal shells, one whereof is perforated, and a separating-layer of soft rubber.

11. A playing-ball comprising a plurality of distinct metal shells, one whereof is perforated, and a separating-layer of soft rubber wherein is embedded said perforated shell.

12. A playing-ball comprising a plurality of distinct metal shells, one whereof is perforated; a separating-layer of soft rubber into which said perforated shell is embedded, and a hard cover of plastic material.

13. A playing-ball comprising a plurality of distinct hard shells, one whereof is perforated, and a separating-layer of soft rubber.

14. A playing-ball comprising a plurality of distinct hard shells, one whereof is perforated, and a separating-layer of soft rubber anchored together through said perforations.

ELEAZER KEMPSHALL.

Witnesses:
 F. W. BARNACLO,
 B. C. STICKNEY.